June 14, 1960  P. F. JACOBS ET AL  2,940,635
TRIPPING MEANS AND DISPENSING APPARATUS
Filed Dec. 30, 1954  6 Sheets-Sheet 1

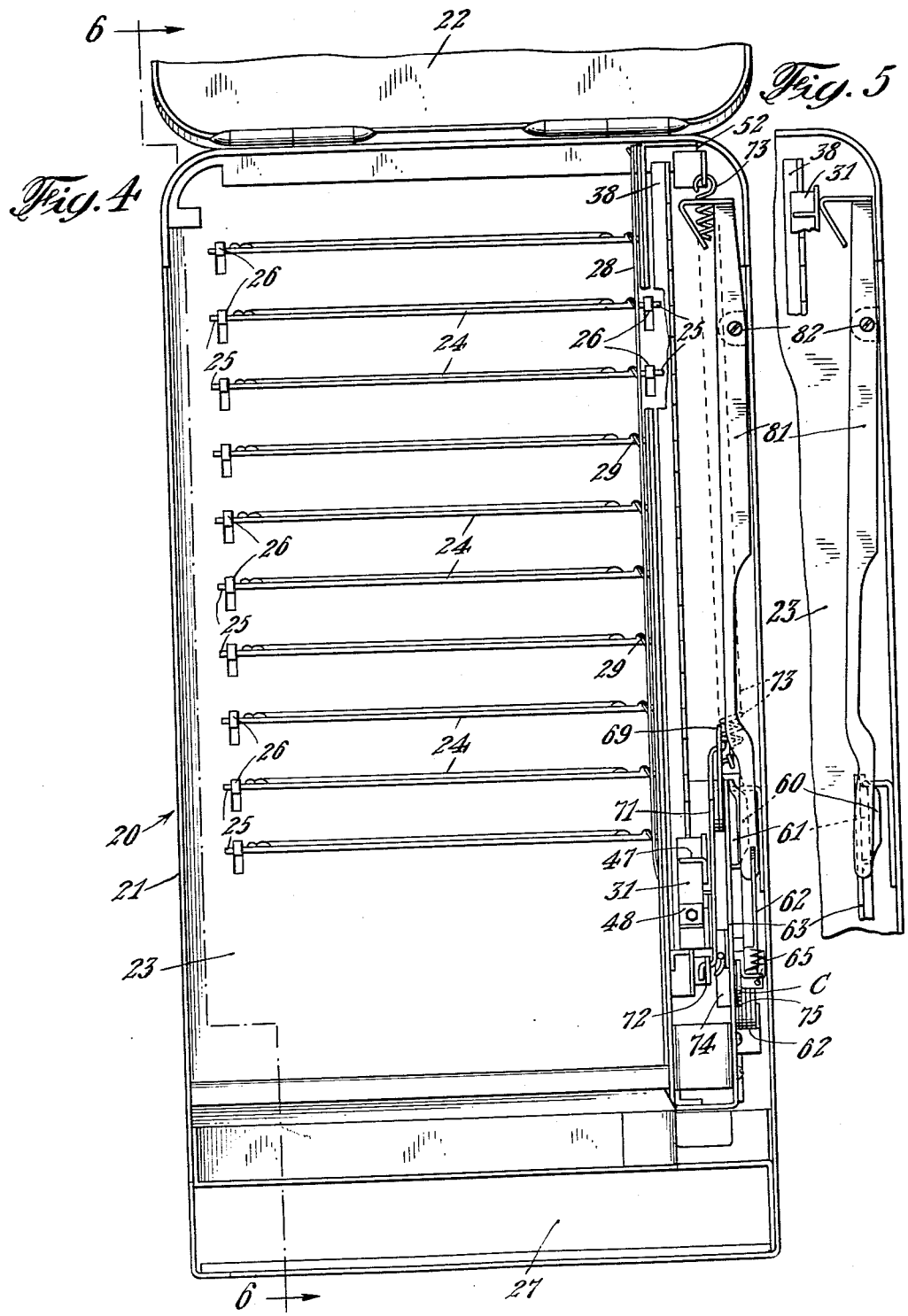

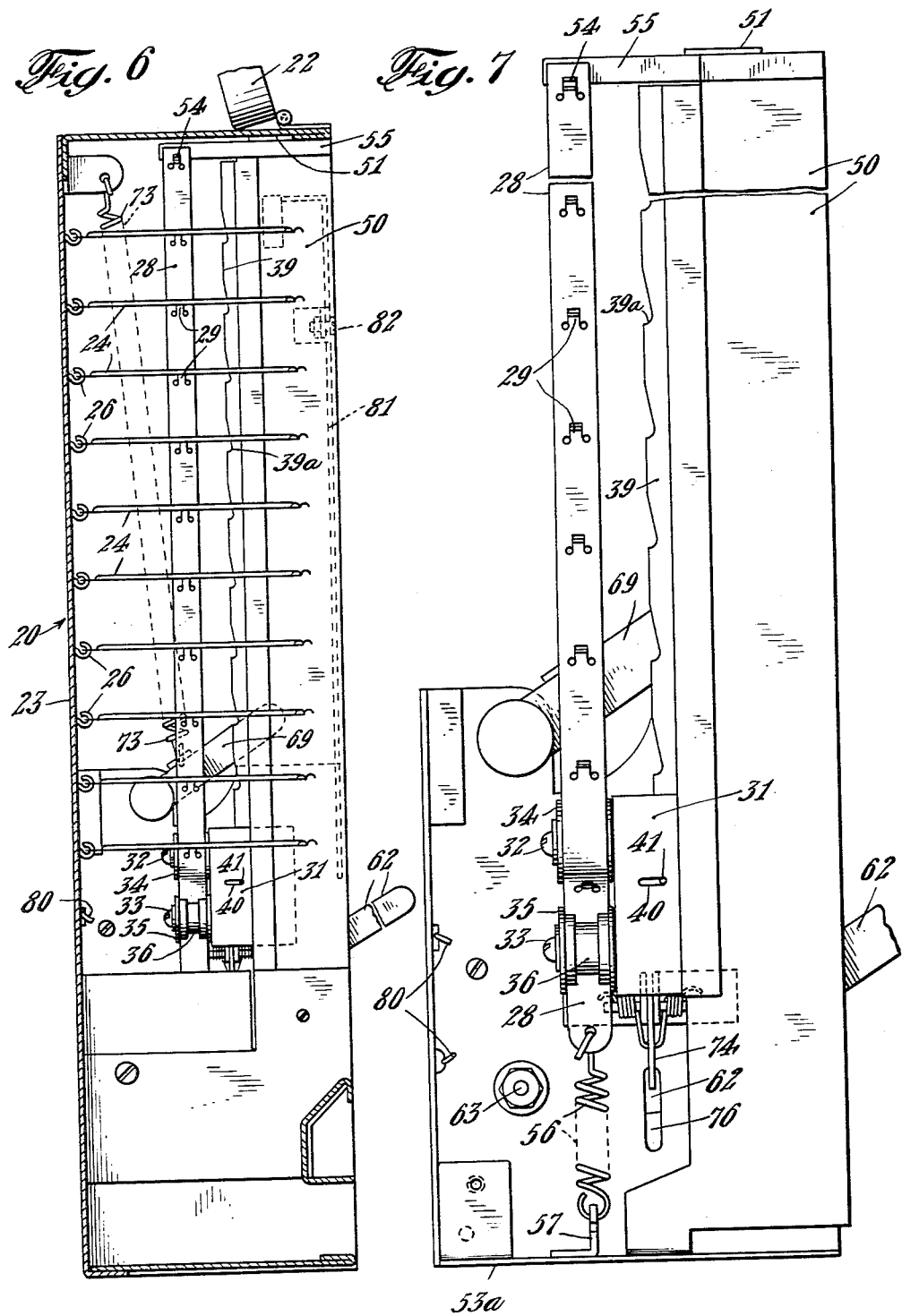

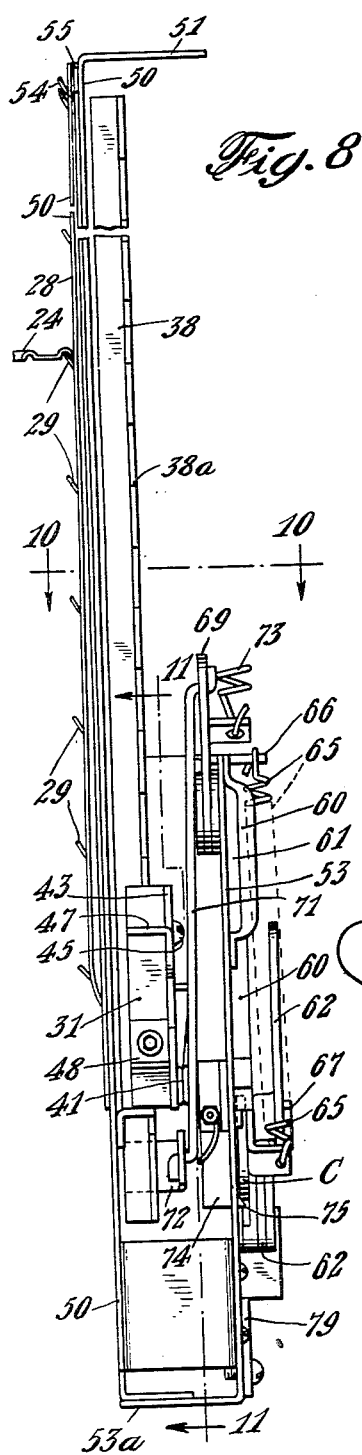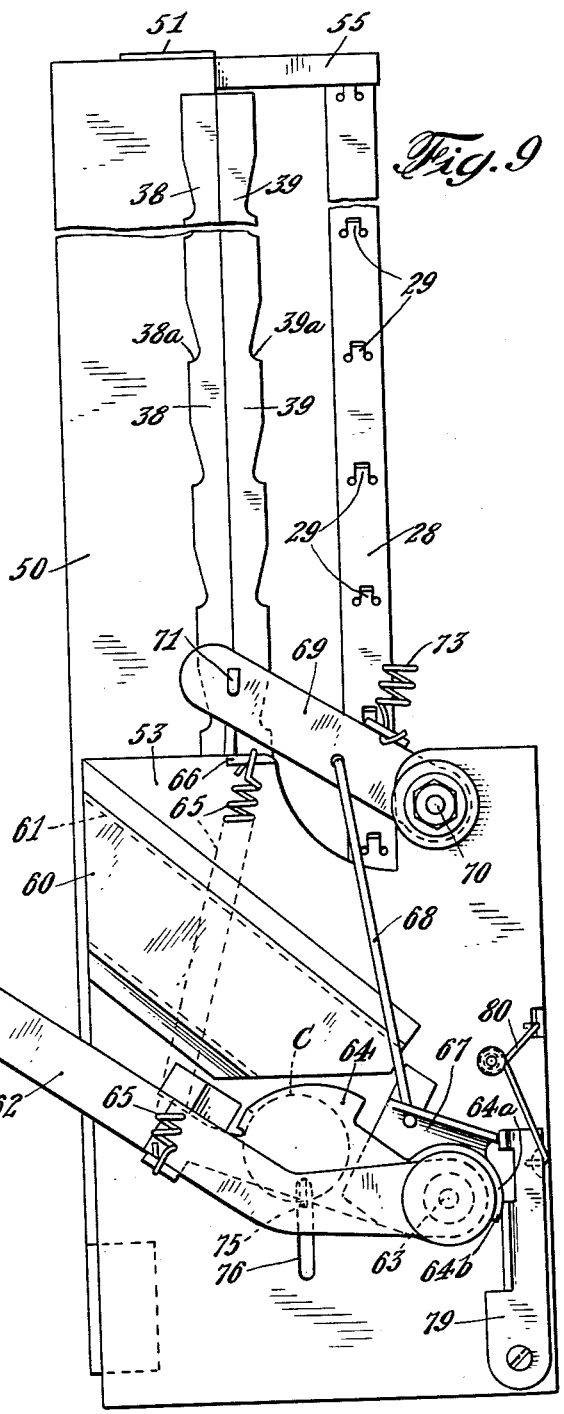

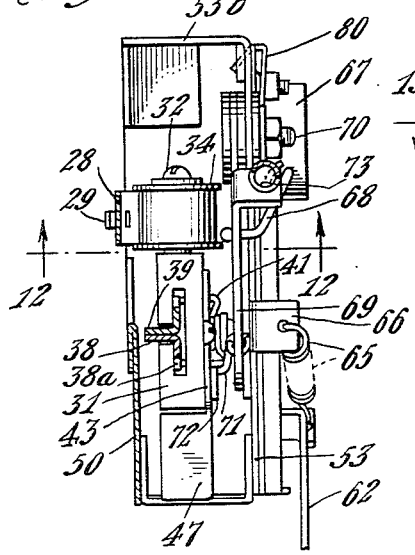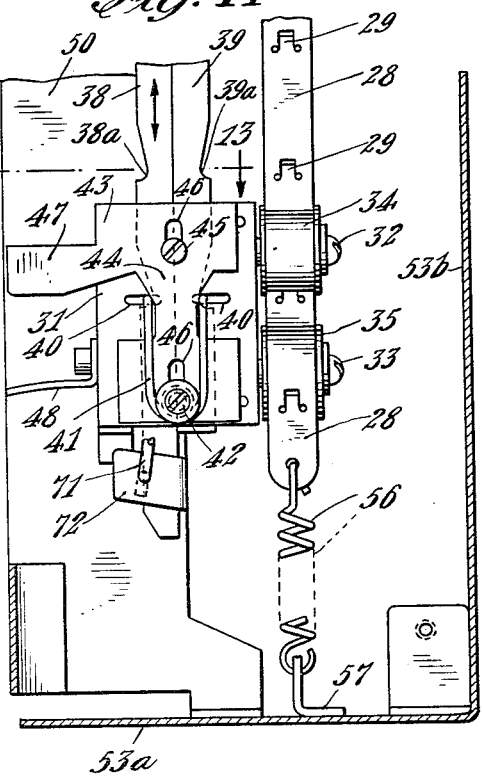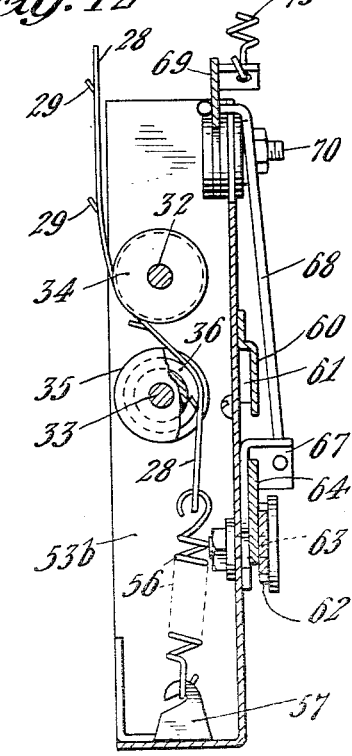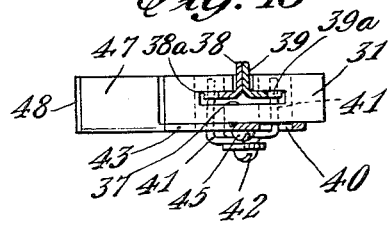

June 14, 1960  P. F. JACOBS ET AL  2,940,635
TRIPPING MEANS AND DISPENSING APPARATUS
Filed Dec. 30, 1954  6 Sheets-Sheet 6
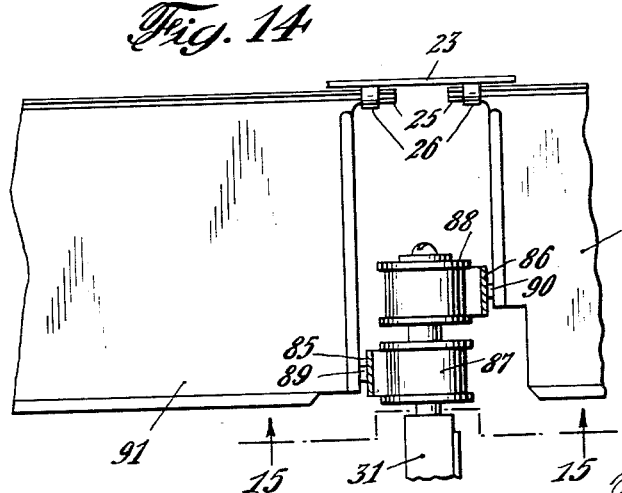
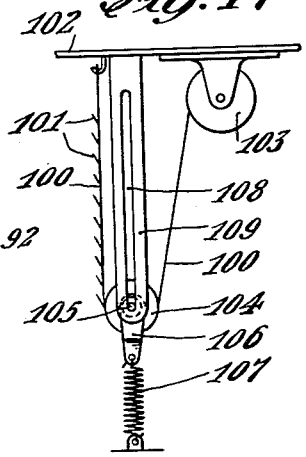
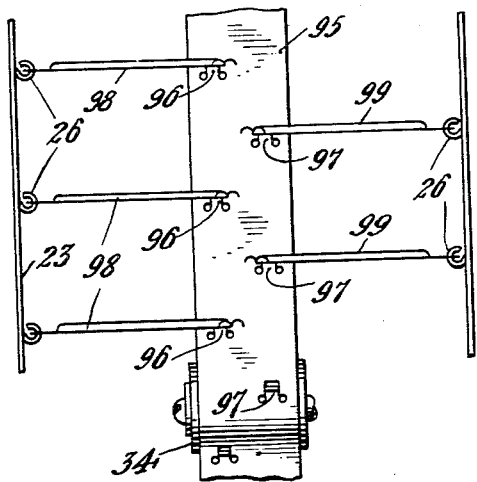
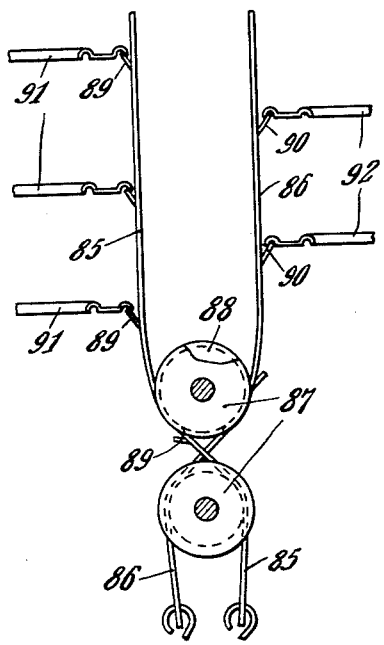

United States Patent Office 2,940,635
Patented June 14, 1960

2,940,635

TRIPPING MEANS AND DISPENSING APPARATUS

Philip F. Jacobs, Old Brookville, Hewitt M. Barnum, Rye, and Julius Edward Greengard, Jr., Bayside, N.Y., assignors to E. B. Metal Products Co., Inc., Long Island City, N.Y., a corporation of New York Filed Dec. 30, 1954, Ser. No. 478,736

12 Claims. (Cl. 221—90)

This invention relates to tripping means and more particularly, but not exclusively, to such tripping means especially well suited for use in shelf-type dispensing machines.

In shelf-type dispensing machine a plurality of shelves are usually mounted in one or more arrays. The shelves in one array may be arranged vertically one above the other and hingedly connected to a support. An article is retained on each of the shelves while they are maintained horizontal and is dispensed by releasing each shelf in sequence from bottom to top. As each shelf is released it is free to swing downwardly to release its article and swing out of the path of the shelves above. Heretofore, shelf-type dispensing devices have been relatively costly primarily because of the cost involved in the manufatcure and installation of the various parts necessary to control the shelves. Usually one or more slidable or angularly displaceable levers were provided for each self with all the levers mounted in a relatively massive housing. The multiplicity of parts necessarily increased the possibility of a malfunction during operation as well as the initial cost of the machine. Numerous efforts have been made to simplify and reduce the cost of such devices. For example, it has been proposed to utilize a flexible steel tape wound about a spring reel which when drawn downwardly and thereby unwound retained each of a plurality of vertically alined shelves. Such an arrangement required that each shelf be provided with a crank which while engaged by the tape held the shelves horizontal and allowed the shelves to fall as the tape was progressively rewound on its reel by means of a reciprocating member.

We have found that it is not necessary to provide a multiplicity of levers or cranks for the purpose of retaining and sequentially releasing a plurality of trippable members such as shelves but that this may be accomplished by a single member which through suitable tabs formed thereon or affixed thereto directly engages and retains each of the trippable members and by progressively displacing said member thereby releasing the shelves in the desired sequence.

It is, therefore, a principal object of our invention to provide improved tripping means having a minimum number of moving parts and which may be operated over a long useful life substantially free from breakdowns.

Another object is to provide such tripping means having a minimum of moving parts which may be utilized to control a plurality of members, the number of movable parts in the tripping means being substantially independent of the number of members to be controlled.

A further object is to provide such tripping means suitable for use in a wide variety of devices which readily lends itself to production by high speed methods at relatively low cost, which is inherently rugged, and which may be readily assembled and installed.

A more specific object is to provide an improved shelf-type dispensing machine of rugged yet low cost construction and incorporating a minimum number of parts.

In accordance with this invention there is provided an elongated flexible tape which is mounted so as to extend in proximity to a plurality of members to be controlled. A plurality of tabs or the like are formed on the tape and are spaced longitudinally therealong so that each engages one of the controlled members. Means are provided for displacing the tape laterally away from the controlled members so that the tabs may be disengaged one by one from the members controlled thereby.

In a shelf-type dispensing machine a plurality of shelves may each be hingedly connected to a support so as to form a spaced array. A flexible tape having a plurality of tabs, one for each of the shelves, is mounted so that normally the tabs are each in position to engage and maintain substantially horizontal one of the shelves. The tape is maintained substantially taut but is displaceable laterally to a limited extent. The tape may be threaded through a traveller so that the tabs on the portion thereof on one side of the traveller are in position to engage their shelves while the portion of the tape on the other side of the traveller is laterally displaced at least a distance sufficient to insure release of the shelves. As the traveller is displaced longitudinally along the tape the tabs carried by the tape are each successively displaced laterally and thereby disengaged from their respective shelves which are freed in turn to release the articles supported thereon.

A single tape may be used to actuate a relatively large or small number of members such as the shelves of a shelf-type dispenser. In one embodiment, which will be described, two rows or columns of tabs may be formed on a single tape with the tabs in one colunm offset longitudinally from those in the other column to control two adjacent arrays of shelves.

In another embodiment two tapes are oppositely threaded through a common displacing means with each tape carrying one or two columns of tabs for controlling one or two arrays of shelves respectively. With two tapes each carrying two columns of tabs four adjacent arrays of shelves may be controlled permitting use of a common displacing means for all the tapes.

Further objects as well as advantages of this invention will be apparent from the following discription and the accompanying drawings in which:

Figure 4 is a front elevational view of the machine with the cover raised and partially cut away for convenience;

Figure 5 is a fragmentary elevational view showing the slot closing lever displaced to close the coin slot;

Figure 6 is a side elevational view partially in section taken through the line 6—6 of Figure 4;

Figures 7, 8 and 9 are respectively left, front and right-hand elevational views of the tripping means shown in Figure 4 and drawn on a further enlarged scale;

Figure 1:
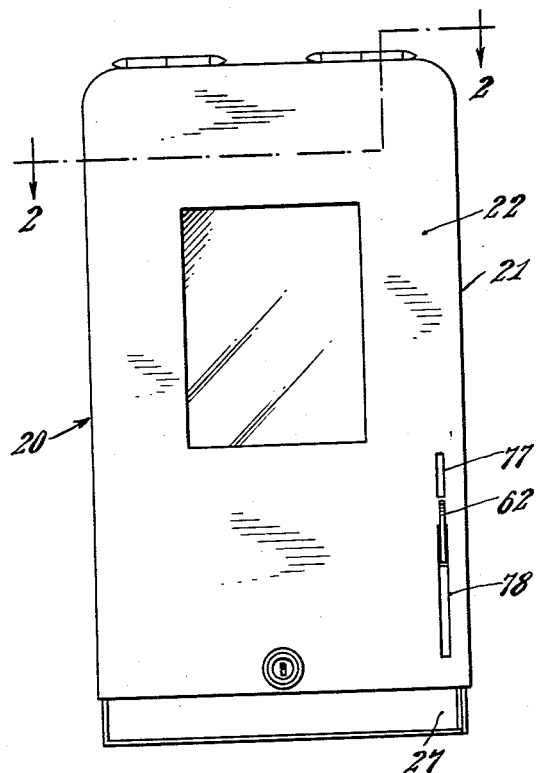
Figure 1 is a front elevational view of a dispensing machine embodying the present invention.

Figures 10 and 11 are each sectional views through the lines 10—10 and 11—11 respectively of Figure 8;

Figure 12 is a sectional view taken through the line 12—12 of Figure 10;

Figure 13 is a sectional view taken through the line 13—13 of Figure 11;

Figure 14 is a plan view partially in section and broken away for convenience of another embodiment of this invention;

Figure 15 is a fragmentary front elevational view of the device shown in Figure 14 as viewed in the direction indicated along the line 15—15;

Figure 16 is a fragmentary side elevational view of yet another embodiment of this invention; and Figure 17 is a side elevational view, partially diagrammatic, of another arrangement for displacing the flexible tape.

Referring now to the drawings, dispensing machine 20 comprises a housing 21 having a hinged front cover 22 and a rear wall 23 to which a plurality of shelves 24 are each hingedly connected in spaced vertical array. Shelves 24 may be readily formed from sheet metal or other suitable material and may be provided with peripheral rigidifying channels. As shown, shelves 24 may each be formed with integral extensions 25 and together with hooks 26 formed along rear wall 23 in which they are engaged form suitable hinges. The shelves 24, of which there are ten in the present instance, are shown as supported and retained in their horizontal positions in Figures 4 and 6. As the shelves are progressively released from bottom to top they pivot downwardly about their extensions 25 thereby to release an article supported thereon, the article thus being free to fall to delivery chute 27.

Figure 2:
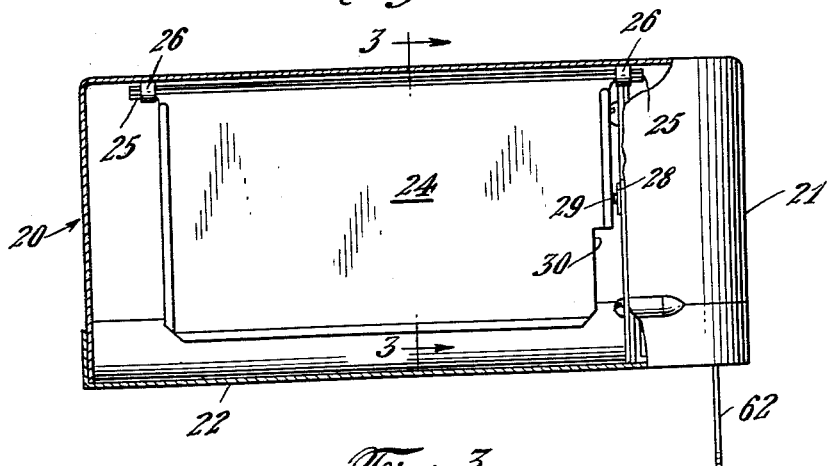
Figure 2 is a sectional view on an enlarged scale through the line 2—2 of Figure 1.
Figure 3:
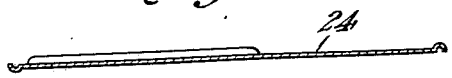
Figure 3 is a sectional view of one of the shelves and taken through the line 3—3 of Figure 2.

Tripping means for maintaining shelves 24 in their horizontal position comprise an elongated flexible tape 28 carrying a plurality of tabs 29, one for each of the shelves 24. Tabs 29 are spaced longitudinally along tape 28 with the interval between adjacent tabs substantially equal to that between the shelves. Tape 28 is supported within housing 21 so that it extends vertically along one side of the shelves 24 with its tabs 29 each normally in position to engage and support one of the shelves. As shown in Figure 2, each of the shelves may be notched as at 30 along the side thereof engaged by the tab to facilitate recycling. As will be more fully described, tape 28 is progressively displaced laterally, to the right as viewed in Figure 4, thereby carrying the tabs successively away from their shelves which are then free to fall. To recycle the apparatus, shelves 24 are manually rotated so that they extend substantially upwardly, tape 28 is returned laterally to its normal position, and then the shelves are permitted to rotate toward their horizontal position. Due to notches 30 each shelf can only engage its own tab and the inconvenience of having to individually set some of the shelves is avoided.

Means for laterally displacing tape 28 may comprise a traveller 31 (Figures 10-13) movable along the tape and carrying two studs 32, 33 on which may be respectively mounted rollers 34, 35. Tape 28 is threaded between rollers 34, 35. Flexing of tabs 29 as the tape passes around the lower roller 35 may be avoided by providing a channel 36 (Figure 12) along the rim of roller 35.

Traveller 31 has a slot 37 formed therethrough which is T-shaped in cross section and through which a pair of racks in the form of angle members 38, 39 extend in side by side relation. The outwardly extending wings of each of the angle members 38, 39 are serrated to provide notches, spaced at intervals corresponding to the spacing between shelves 24. Communicating with T-shaped slot 37 is a transverse slot 40 formed in traveller 31, and in which extend the extremities of resilient member 41 which is retained on traveller 31 by means of bolt 42. The extremities of resilient member 41 are permanently biased toward each other and tend to enter the notches formed along angle members 38, 39 when they come into alinement therewith. Angle member 39 may be fixed in place in any suitable manner while angle member 38 is free to be displaced vertically to a limited extent. The notches in fixed angle member 39 serve to prevent retrograde or downward movement of traveller 31 because of the engagement therein of one of the extremities of resilient member 41. The notches in both of the angle members are tapered upwardly as shown in Figure 11 to facilitate forward or upward movement of the traveller. When reciprocating angle member 38 is displaced downwardly a distance corresponding to the interval between two adjacent notches, the left-hand extremity of resilient member 41 becomes engaged in the next succeeding notch indicated at 38a in Figure 11. Return of angle member 38 to its initial position serves to carry traveller 31 upwardly and at the end of this movement the right-hand extremity of resilient member 41 becomes seated in notch 39a of angle member 39.

It will be evident that repeated reciprocation of angle member 38 will result in progressive movement of traveller 31. Rollers 34, 35, carried by traveller 31 cause progressive displacement of tape 28 laterally, thereby disengaging tabs 29 one by one from their shelves.

When traveller 31 reaches the top of its movement, tape 28 will have been completely laterally displaced, and all of the shelves 24 will have been released. To facilitate resetting, a releasing member 43, having a tapered portion 44, is mounted on traveller 31 by means of a bolt 45 as well as bolt 42. Elongated slots 46 are formed in releasing member 43 for each of the bolts 42, 45 and permit limited displacement of releasing member 43 relative to traveller 31. Releasing member 43 also carries a finger piece 47 which, together with finger piece 48, fixed to traveller 31 facilitates manual displacement of member 43. It will be evident from Figure 11 that downward displacement of releasing member 43 causes outward displacement of the extremities of resilient member 41 by tapered portion 44. With the extremities of resilient member 41 thus held in their outward position traveller 31 is readily returned to its starting position thereby returning tape 28 to its normal position.

The tripping means which as thus far described includes tape 28, traveller 31, rack 38 and fixed member 39 as well as actuating means for reciprocating rack 38 to be described may conveniently be formed as a subassembly. For this purpose, an elongated support member 50 is provided having its upper end portion 51, as viewed in Figure 8, turned over by means of which it is readily fixed to the top of housing 21 as indicated at 52 (see Figure 4). A plate member 53 L-shaped in both horizontal and vertical cross section is fixed to support member 50 in spaced parallel relation. The upper end of tape 28 may be connected to a tab 54 on an arm 55 connected to support member 50. The lower end of tape 28 may be rigidly secured to bottom portion 53a of plate member 53 or as shown, tape 28 may be connected to one end of a spring 56 (Figure 7) the other end of which is connected to bottom portion 53a of the plate member by means of a bracket 57.

Angle member 39 is provided with an extension which when the parts are assembled for operation extends beyond member 38 and is fixed to bottom portion 53a of plate member 53. The upper ends of angle members 38, 39 may be left free but if desired angle member 39 may be additionally supported by securing the same to support member 50.

As indicated above, support member 50 and plate member 53 are conveniently utilized to support the actuating means for reciprocating angle member 38. While any suitable actuating means may be provided it may be one of a type commonly referred to as a missing link mechanism which requires insertion of a coin of a particular denomination to permit operation. Turning now to the actuating means, it is seen that plate member 53 carries a channel member 60 and together therewith forms a coin chute 61 the lower end of which opens above a main operating lever 62 mounted for rotation about a pivot 63 connected to plate member 53. A second lever 64 is pivotally connected adjacent to one end thereof to plate member 53 and at the other end thereof is provided with a lateral extension which passes below main lever 62 and is connected to one end of a return spring 65.

Return spring 65 extends upwardly from said lateral extension and the other end thereof is connected to plate member 53 at 66. Mounted for rotation about pivot 63 and positioned between plate member 53 and lever 64 is a stub lever 67 which is connected by means of rod 68 to crank 69. Crank 69 is pivotally mounted on plate member 53 by means of a stud 70 and is linked with reciprocating member 38 by rod 71 which is connected thereto and to a connector 72 which is in turn connected to member 38. Crank 69 and reciprocating member 38 linked therewith are biased upwardly by a main spring 73 one end of which is connected to crank 69 and the other end of which may be connected to housing rear wall 23 adjacent to the top thereof as shown in Figure 4. In some instances it may be convenient to connect an end of main spring 73 to support member 50. A spring biased detent 74 is mounted on the left-hand side of plate number 53 as viewed in Figure 8 and has a toe 75 extending through slot 76 formed in the plate member 53.

The operating subassembly may be completely assembled and tested prior to insertion into housing 21 where it may be readily fixed in place as by spot welding and when properly located the mouth of chute 61 is alined with slot 77 while operating lever 62 extends through slot 78; both said slots being formed in front cover 22 as shown in Figure 1.

When a coin C is inserted through slot 77 it drops down through chute 61 to lodge upon the toe 75 of detent 74. Now when the outer end of lever 62 is depressed lever 64 is rotated downwardly therewith and its motion is transmitted through coin C to stub lever 67 which is thereby rotated counterclockwise as viewed in Figure 9. Crank 69 being linked with stub lever 67 through rod 68 is also rotated counterclockwise and its downward motion is in turn imparted to reciprocating angle member 38 through rod 71. The arrangement is such that the travel of operating lever 62 permitted by slot 78 ensures sufficient downward displacement of member 38 so that resilient member 41 comes into engagement with the next succeeding notch in member 38 as described hereinabove. At the same time coin C is carried downward to clear the toe of detent 74 which then returns through slot 76 to insure ejection of the coin from between lever 64 and stub lever 67, thereby freeing the latter and leaving it once again independent in its motion of levers 62 and 64. Main spring 73 which was expanded by the rotation of crank 69 now returns to its normal condition carrying crank 69, the now freed stub lever 67 as well as reciprocating member 38 upwardly. Upward movement of member 38 serves to advance traveller 31 and displace the next tab 29 from its shelf 24 as was described.

To avoid the possibility of repeated operation of the mechanism by the same coin, in addition to detent 74 there is provided a lever detent 79 mounted on plate member 53 and urged by spring 80 into engagement with a portion 64a of lever 64 having an enlarged radius and terminating in a shoulder 64b. As most clearly shown in Figure 9 the effect of main spring 73 acting through stub lever 67 is to maintain detent 79 to the right. Hence, at the start of operation when stub lever 67 is rotated counterclockwise it is rotated out of engagement with detent 79 and the latter is then free to prevent the return of lever 64. The effect of this is to prevent return of lever 64 by spring 65 in the event lever 62 is raised before coin C has been carried below the toe 75 of detent 74. Repeated operation of the mechanism will result in shelves 24 being tripped in succession until traveller 31 reaches the end of its travel and the machine is empty. As shown in Figures 4 and 5, an elongated masking member 81 is pivotally mounted at 82 and when engaged at its upper end by traveller 31 swings about its pivot to interpose its lower portion between slot 77 and chute 61.

It is to be understood that while tape 28 has been shown and described as extending vertically it may be positioned horizontally or otherwise without impairing its usefulness.

Its present vertical disposition and progressive lateral displacement by an upwardly moving displacing means is advantageous in the shelf-type dispenser shown. Preferably, tape 28 is made of spring steel with tabs 29 being formed by a combined punching, slitting and drawing operation. Tape 28 may be formed of other suitably flexible materials such as fabric, rubber or suitable plastics; the tabs being attached thereto or moulded integrally therewith as in the case of a rubber or plastic tape. It will be evident that the shape of tabs 29 may be varied to suit specific requirements. They may be formed as bosses integral with the tape or may be separately formed of different material and attached thereto.

Multiple arrays of shelves may be provided and as shown in Figures 14 and 15 two tapes 85, 86 having tabs as was described in connection with tape 28 may be oppositely threaded between two adjacent sets of rollers 87, 88 carried by a traveller which otherwise may be similar to traveller 31 and similarly actuated. As shown most clearly in Figure 15, tape 85 carried tabs 89 while tape 86 carries tabs 90. The tabs on one tape being spaced longitudinally therealong and in staggered relation with respect to the tabs on the other tape. Upward displacement of the traveller carries both sets of rollers 86, 87 upwards and serves simultaneously to displace laterally each of the tapes but in opposite directions. The distance traversed by the traveller in any one step is equal to half the distance between adjacent tabs on one of the tapes, tabs 90 being spaced midway between tabs 89 in a vertical sense. Consequently, progressive upward movement of the traveller causes alternate displacement of a tab 89 and then a tab 90 thereby to release alternately a shelf 91 and a shelf 92.

In Figure 16, tape 95 is provided with two spaced rows of tabs 96, 97 with tabs 96 offset longitudinally with respect to tabs 97 a distance equal to half that between adjacent tabs 96. Shelves 98 are each positioned for engagement with one of the tabs 96 and are similarly staggered with respect to shelves 99 which engage tabs 97. Here the traveller is progressively displaced a distance equal to the vertical distance between adjacent tabs 96, 97. It will be apparent that by mounting two such tapes 95 as was described in connection with tapes 85, 86 four rows of tabs with the tabs of any one row offset with respect to the tabs in the remaining rows may be provided for the operation of four arrays of shelves. In such an arrangement the traveller is progressively displaced a distance equal to one fourth the interval between adjacent tabs of the same row.

In Figure 17, flexible tape 100, similar to tape 28, carries tabs 101 and is connected at one end to a frame member 102. The other end of tape 100 is connected to a rotatably mounted reel 103 about which it is wound. Intermediate its ends, tape 100 passes partially about a roller 104 mounted on a pin 105 to which is connected yoke 106. Yoke 106 is biased downwardly, as shown, by means of spring 107. The extremities of pin 105 extend in slots 108 formed in guide members 109 only one of which is shown in Figure 17. As shown, tape 100 is in position to retain or support trippable members such as shelves 24. When reel 103 is rotated clockwise, as viewed, tape 100 is wound thereon, causing roller 104 to travel upwardly along its guide members 109. As tape 100 passes about roller 104 it is displaced to the right thereby carrying its tabs 101 away from the members retained thereby. To reset tape 100 it is only necessary to rotate reel 103 counterclockwise, spring 107 serving to draw roller 104 back to its starting position.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. Dispensing apparatus, comprising a housing, a plurality of shelves hingedly mounted in said housing in spaced array, an elongated flexible tape, means maintaining said tape substantially taut and normally supporting the same adjacent said shelves, a plurality of tabs on said tape and spaced longitudinally therealong, each of said tabs being presented toward and normally in position for engaging one of said shelves and supporting the same, and means for displacing said tape laterally away from said shelves thereby withdrawing said tabs from said normal positions.

2. Dispensing apparatus, comprising a plurality of trippable shelves mounted in spaced array, an elongated flexible tape, means normally supporting said tape adjacent said shelves, a plurality of tabs on said tape and spaced longitudinally therealong, each of said tabs being presented toward and engaging one of said shelves, and means for displacing said tape laterally away from said shelves thereby withdrawing said tabs from and tripping said shelves.

3. Dispensing apparatus, comprising a plurality of trippable shelves mounted in spaced array, an elongated flexible tape, means normally supporting said tape adjacent said shelves, a plurality of tabs on said tape and spaced longitudinally therealong, each of said tabs being presented toward and engaging one of said shelves, and means for progressively displacing said tape laterally away from said shelves thereby withdrawing said tabs one by one from and successively tripping said shelves.

4. Dispensing apparatus, comprising a plurality of trippable shelves mounted in spaced array, an elongated flexible tape, means normally supporting said tape adjacent said shelves, a plurality of tabs on said tape and spaced longitudinally therealong, each of said tabs being presented toward and engaging one of said shelves, and means including a movable member engaging said tape and movable longitudinally relative thereto for progressively displacing said tape laterally away from said shelves thereby withdrawing said tabs from and successively tripping said shelves.

5. Dispensing apparatus, comprising a plurality of trippable shelves mounted in spaced array, an elongated flexible tape, means maintaining said tape taut and normally supporting the same adjacent said shelves, a plurality of tabs on said tape and spaced longitudinally therealong, each of said tabs being presented toward and engaging one of said shelves, a movable traveller so engaging said tape intermediate the ends thereof that the portion of said tape on one side of said traveller is adjacent said shelves and the portion of said tape on the other side of said traveller is laterally displaced away from said shelves, and means for supporting and progressively moving said traveller longitudinally relative to said tape thereby progressively laterally displacing said tape and said tabs away from and tripping said shelves.

6. Dispensing apparatus, comprising a plurality of trippable shelves mounted in spaced array, an elongated flexible tape, means maintaining said tape taut and normally supporting the same adjacent said shelves, a plurality of tabs on said tape and spaced longitudinally therealong, each of said tabs being presented toward and engaging one of said shelves, a movable traveller engaging said tape adjacent one end thereof and laterally displacing away from said shelves the portion of said tape intermediate said traveller and said one end, means including a reciprocable member engaging said traveller for progressively moving said traveller longitudinally along said tape and progressively laterally displacing said tape away from said shelves thereby withdrawing said tabs from and successively tripping said shelves.

7. Dispensing apparatus, comprising a plurality of trippable shelves mounted in spaced array, an elongated flexible tape, a plurality of tabs one for each of said shelves and spaced longitudinally along said tape, each of said tabs being presented toward and engaging one of said shelves, a movable member, guide means carried by said movable member and engaging opposite surfaces of said tape, means maintaining said tape taut and normally supporting said tape so that the portion thereof on one side of said guide means extends adjacent said shelves while the portion of said tape on the other side of said guide means is laterally spaced away from said shelves, and means for supporting and moving said movable member longitudinally relative to said tape thereby laterally displacing said tape and said tabs away from and tripping said shelves.

8. Dispensing apparatus, comprising a plurality of trippable shelves mounted in spaced array, an elongated flexible tape, a plurality of tabs one for each of said shelves and spaced longitudinally along said tape, each of said tabs being presented toward and engaging one of said shelves, a movable member, a pair of spaced guide members carried by said movable member and engaging opposite surfaces of said tape, means maintaining said tape taut and normally supporting said tape so that the portion thereof on one side of said guide members extends adjacent said shelves while the portion of said tape on the other side of said guide members is laterally spaced away from said shelves, and means for supporting and moving said movable member and the guide means carried thereby longitudinally relative to said tape thereby laterally displacing said tape and said tabs away from and tripping said shelves.

9. Tripping means for progressively tripping a plurality of spaced members, comprising an elongated flexible tape, a plurality of tabs one for each of said members spaced longitudinally on said tape, means for supporting said tape adjacent said members with each of said tabs in position for engagement with one of said members, and means including a movable member engaging said tape and movable longitudinally relative thereto for so progressively displacing said tape laterally that said tabs are carried one by one away from their said positions.

10. Tripping means for progressively tripping a plurality of spaced members, comprising an elongated flexible tape, a plurality of tabs spaced longitudinally on one portion of said tape and each extending away from one side of said tape for engagement with each of said spaced members, means supporting said tape substantially taut with each of said tabs in position for engaging one of said spaced members, a traveller engaging said tape intermediate the ends thereof, said one portion of said tape on one side of said traveller being laterally displaced relative to the portion of said tape on the other side of said traveller, and means for progressively displacing said traveller longitudinally along said tape past said tabs and thereby displace said tabs from their said positions.

11. Dispensing apparatus, comprising a plurality of trippable shelves mounted in two spaced side by side arrays, an elongated flexible tape, a plurality of tabs one for each of said shelves and spaced longitudinally along said tape, said tabs forming two rows along one surface of said tape with each tab being presented toward and engaging one of said shelves, a movable member, guide means carried by said movable member engaging said tape and displacing one portion thereof relative to another portion thereof, means maintaining said tape taut and normally supporting said tape so that the portion thereof on one side of said guide means extends adjacent said shelves while the portion of said tape on the other side of said guide means is laterally displaced in the direction away from said shelves, and means for supporting and moving said movable member longitudinally relative to said tape thereby laterally displacing said tape and said tabs away from and tripping said shelves.

12. Dispensing apparatus, comprising a plurality of trippable shelves mounted in at least two spaced side by side arrays, a pair of elongated flexible tapes one for each of said arrays, a plurality of tabs spaced longitudinally along each of said tapes with the tabs on each of said tapes being presented toward and engaging the shelves in one of said arrays, a movable member, guide means carried by said movable member engaging said tapes and displacing portions of said tapes relative to the remainder thereof, means maintaining said tapes taut and normally supporting said tapes so that the portions thereof on one side of said guide means extend adjacent their respective shelves while the portions of said tapes on the other side of said guide means are laterally displaced in opposite directions relative to each other and away from their respective shelves, and means for supporting and moving said movable member longitudinally relative to said tapes, whereby said tapes are progressively laterally displaced away from said shelves and said tabs are progressively withdrawn from engagement with their respective shelves.

References Cited in the file of this patent

UNITED STATES PATENTS

| | | |
|---|---|---|
| 217,751 | Simpson | July 22, 1879 |
| 221,089 | Murphey et al. | Oct. 28, 1879 |
| 616,441 | Dunham | Dec. 20, 1898 |
| 733,458 | Cockerell | July 14, 1903 |
| 1,658,683 | Jacob | Feb. 7, 1928 |
| 1,940,005 | McKee et al. | Dec. 19, 1933 |
| 2,006,408 | Reichart | July 2, 1935 |

FOREIGN PATENTS

| | | |
|---|---|---|
| 123,540 | Germany | Sept. 7, 1901 |
| 425/26 | Australia | Nov. 6, 1926 |